(12) United States Patent
Mauermann et al.

(10) Patent No.: US 7,377,021 B2
(45) Date of Patent: May 27, 2008

(54) METHOD, DEVICE AND AUXILIARY JOINING ELEMENT FOR JOINING AT LEAST TWO PARTS

(75) Inventors: Reinhard Mauermann, Dresden (DE); Fred Jesche, Mohorn (DE); Stephan Dietrich, Dresden (DE); Lutz Lachmann, Dresden (DE)

(73) Assignee: Fraunhofer-Gesellschaft zur Foerderung der Angewandten Forschung, e.V., Munich (DE)

( * ) Notice: Subject to any disclaimer, the term of this patent is extended or adjusted under 35 U.S.C. 154(b) by 0 days.

(21) Appl. No.: 10/953,618

(22) Filed: Sep. 27, 2004

(65) Prior Publication Data
US 2005/0120532 A1 Jun. 9, 2005

Related U.S. Application Data

(63) Continuation of application No. PCT/EP03/03206, filed on Mar. 27, 2003.

(30) Foreign Application Priority Data
Mar. 27, 2002 (DE) ................. 102 13 793

(51) Int. Cl.
*B21J 15/02* (2006.01)
(52) U.S. Cl. ............. 29/525.05; 29/521; 29/522.1; 29/525
(58) Field of Classification Search ......... 29/522.1, 29/524.1, 521, 525, 505, 514, 525.05, 512, 29/525.06
See application file for complete search history.

(56) References Cited

U.S. PATENT DOCUMENTS

| | | | | |
|---|---|---|---|---|
| 3,353,227 A | * | 11/1967 | Kabel | 24/16 PB |
| 5,884,386 A | * | 3/1999 | Blacket et al. | 29/522.1 |
| 6,161,273 A | * | 12/2000 | Rivera et al. | 29/525.06 |
| 6,473,957 B1 | * | 11/2002 | Voelkner et al. | 29/505 |
| 6,722,013 B1 | | 4/2004 | Rapp | |
| 6,763,568 B1 | * | 7/2004 | Mauermann et al. | 29/432.2 |
| 2002/0125297 A1 | * | 9/2002 | Stol et al. | 228/112.1 |

FOREIGN PATENT DOCUMENTS

DE 10102712 A1 * 8/2002

* cited by examiner

*Primary Examiner*—David P. Bryant
*Assistant Examiner*—Christopher M Koehler
(74) *Attorney, Agent, or Firm*—Cochran Freund & Young LLC; James R. Young

(57) ABSTRACT

Two components are held in at least partially overlapping relation to each other between a hold-down device and an essentially flat lower tool and then are joined together by pressing an auxiliary joining element into one of the components a sufficient distance to plastically deform the components in a manner that positively joins the two components together. A tool with an optional wobbling movement and/or an optional variable force is used to press the auxiliary joining element into the first component. The magnitude of force applied by the hold-down device affects the direction of plastic flow of the material of the components in relation to the flat lower tool.

19 Claims, 4 Drawing Sheets

METHOD, DEVICE AND AUXILIARY JOINING ELEMENT FOR JOINING AT LEAST TWO PARTS

CROSS REFERENCE TO RELATED INVENTIONS

This is a continuation of International Application PCT/EP03/03206, with an international filing date of Mar. 27, 2003, and German Patent Application No. DE 102 13 793.5, filed on Mar. 27, 2002.

BACKGROUND OF THE INVENTION

1. Field of the Invention

The present invention relates to a method for joining at least two components, which overlap at least in part, in a mechanical joining process without pre-punching, an auxiliary joining element used for this purpose, and a device for joining at least two components, which overlap at least in part, in a mechanical joining process without pre-punching according to the generic clause of claim 14.

The present invention relates in particular to a method and a device in the case of which at least two components are joined to one another under plastic deformation of said components by means of auxiliary joining elements, especially clinch rivets.

2. State of the Prior Art

In the sheet metal working industry, individual components are joined by the production methods of mechanical joining technology. The invention relates to the field of mechanical joining technology in which prepunching is not required. These low-priced methods are especially used in mass production processes in the automobile industry.

The prior art discloses methods and devices for joining overlapping, especially plateshaped components, without the process step of prepunching, the joint between the components being here established either with the aid of an auxiliary joining element, especially by means of punch riveting with a semitubular rivet or a solid rivet, or with the aid of the so-called clinching without the use of an auxiliary joining element.

In the case of these methods an overlapping area of the components is arranged between a punch and a lower die. This punch is then either pressed directly into the joining region of said two components under application of a strong force, whereby the two components undergo plastic deformation, or an auxiliary joining element is pressed into the partners to be joined with the aid of a punch. The lower die is implemented such that, when the two components undergo deformation, undercut areas are formed in the joining region between said components or between said components and the auxiliary joining element.

When an auxiliary joining element is used, said auxiliary joining element itself my be provided with undercut portions, said auxiliary joining element being then encompassed by the two components in the joining region when the components undergo plastic deformation.

In the case of these known methods, a joining force is applied by means of the punch to both components from one side, and the lower die, which is located on the opposite side, serves to take up this joining force.

In the case of variants of this method which are known as well, the linear movement of the punch is superimposed by a wobbling movement so as to reduce the joining forces and improve the flow of material, where appropriate.

In the case of the known punch-riveting process making use of a solid rivet, the auxiliary joining element is, without prepunching, pressed into the plates to be joined by means of a straight movement; in the course of this process, the opposite side is shaped by a hollow lower die and a plurality of slugs is produced as waste. The auxiliary joining element is hardened, executes the function of the cutting punch during cutting and is not deformed in the joining process.

In the case of the known wobbling punch-riveting process executed with a semitubular rivet (DE 199 27 103), the auxiliary joining element is pressed into the plates to be joined with a straight and wobbling movement, without prepunching; in the course of this process, the opposite side is shaped by a lower die and no waste is produced. The auxiliary joining element undergoes deformation during the joining process, whereby an undercut is formed.

In the case of the known wobble clinching process (DE 199 45 743), an undercut is formed in the plates to be joined, said undercut being formed, without prepunching, by means of the punch executing a straight and wobbling movement; in the course of this process, the opposite side is shaped by a lower die and no waste is produced.

In the case of the known tox clinching process (DE 199 13 695), an auxiliary joining element is pressed into the plates to be joined with a straight movement and without prepunching; in the course of this process, the opposite side is shaped by a lower die and no waste is produced.

These methods can be used when both sides of the components to be joined are accessible so that both the punch and the lower die can be arranged appropriately. Since the punch must be in alignment with the lower die, so-called C-shaped bows are used as tool frames for positioning the punch and the lower die relative to one another.

All the above-mentioned methods have the disadvantage of low coaxial tolerance. The lower die and the punch or the lower die and the auxiliary joining element must be positioned relative to one another with high accuracy so as to produce a joint of sufficient quality.

For the above-described method of punch riveting with a solid rivet, strong forces are required. These strong joining forces entail high requirements as far as the guiding of the tools is concerned. These high stresses on the tools and on the tool frames restrict the use of this method for high-strength plates. Moreover, they limit the outreach for the C-shaped bows, which are predominantly used as a tool frame, and this leads to a restriction of the applicability of the method.

Furthermore, punch riveting processes making use of a solid rivet have great disadvantages, firstly insofar as waste in the form of a plurality of slugs per joint is produced, said waste impairing the process security of the subsequent processing steps, and, secondly, insofar as the plates located on the side of the lower die get often jammed on the lower die thus causing wear and breakage of the lower die, and, thirdly, insofar as the auxiliary joining element is complicated and expensive to produce.

Also tox rivet clinching processes necessitate the application of high forces.

Both the punch riveting process making use of solid rivets or semitubular rivets and the tox rivet clinching process are additionally disadvantageous insofar as far-reaching coaxiality demands between the punch and the lower die have to be fulfilled and insofar as it is necessary to sort the auxiliary joining elements with respect to upper and lower sides, i.e. it is necessary to realize a complicated auxiliary joining element supply.

A further method has been suggested in DE 101 02 712. In the case of this method, the partners to be joined are joined by means of rivets which have a high hardness and which do not undergo a substantial deformation in the course of this process. This method does not necessitate the use of a patterned lower die. A flat anvil used as a countertool suffices for producing high-quality joints.

When this method is used, problems may arise due to the fact that the rivets are susceptible to cracking in view of the high hardness and due to cavities on the circumferential surface of the rivet, said cavities having a negative effect on the strength of the joint in the case of contact with corrosive media.

Another disadvantage is that, in the case of rivets which do not undergo substantial deformation, the residual thickness of the lowermost sheet metal layer is markedly reduced and is then often thinner than a critical value of 0.3 mm.

SUMMARY OF THE INVENTION

It is the object of the present invention to provide a method and a device of the type specified at the beginning, and an auxiliary joining element for use with said method and said device, which allow a reduction of the forces that have to be applied in the joining process and which require less accuracy for positioning the auxiliary joining element relative to the countertool.

As far as the method is concerned, this object is achieved by a method for joining at least two components, which overlap at least in part, in a mechanical joining process without prepunching and with the aid of a deformable auxiliary joining element, wherein the auxiliary joining element is pressed into the components to be joined by an upper tool that is displaced against an essentially flat lower tool at least with an axial advancing movement, and these components are joined to one another under plastic deformation of said components as well as of said auxiliary joining element.

Preferred embodiments of the method according to the present invention are disclosed in the dependent claims 2 to 13.

As far as the device is concerned, the object according to the present invention is achieved by a device for joining at least two components, which overlap at least in part, by a mechanical joining process without prepunching and with the aid of a deformable auxiliary joining element, said device comprising an upper tool and a lower tool, a punch being provided, which is a constituent part of the upper tool and which executes a combined wobbling and axial advancing movement and is operatively connected to a plastically deformable auxiliary joining element, and a substantially flat lower tool being arranged on the opposite side of the components to be joined.

Preferred embodiments of the device according to the present invention are disclosed in the dependent claims 15 to 20.

In the case of the method and the device according to the present invention, waste resulting from the punching process is avoided in an advantageous manner. Furthermore, complicated countertools, which may cause jamming of the sheet metal plates and the resultant wear and breakage of the lower die, are avoided, whereby acquisition cost and operating cost will be reduced to a substantial extent. Furthermore, due to the embodiment of the auxiliary joining elements, especially clinch rivets, presented in accordance with the present invention, it will no longer be necessary to orient the auxiliary joining elements prior to supplying them to the machining machine. In addition, the use of deformable rivets allows the production of a high-quality joint without cavities on the circumferential surface of the rivet and without cracks in the rivet. Furthermore, easily producible rivet geometries without undercuts in the original shape can be realized.

As far as the auxiliary joining element is concerned, the object according to the present invention is achieved by an auxiliary joining element for joining at least two components, which overlap at least in part, by a mechanical joining process without prepunching, said auxiliary joining element being implemented as a clinch rivet which undergoes plastic deformation in the joining process, whereby at least an area of reduced width is formed or an existing area of reduced in width is reduced in width still further.

Preferred embodiments of the auxiliary joining element according to the present invention are disclosed in the dependent claims 21 to 30.

BRIEF DESCRIPTION OF THE DRAWINGS

In the following, the invention will be described and explained in detail making reference to embodiments in connection with the associated drawings, in which:

An embodiment is explained with reference to FIG. 1. In FIG. 1, a detail of a joining device is shown.

This joining device is provided with an upper tool comprising a punch 6 and a hold-down device 5, and with a lower tool 4 as a countertool to the upper tool. Both tools are shown only section-wise, i.e., they are not shown completely.

Figure 1:
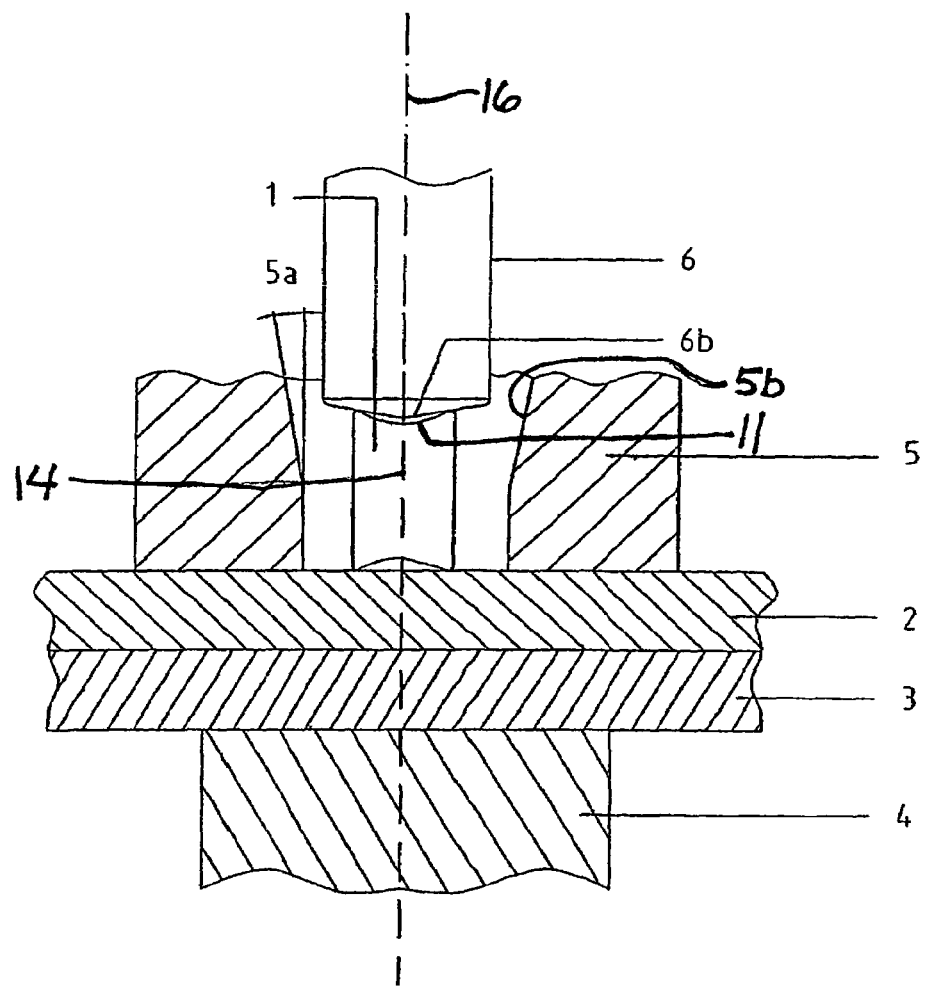
FIG. 1 shows a device and plate-shaped components prior to the production of the joint.
Figure 4:
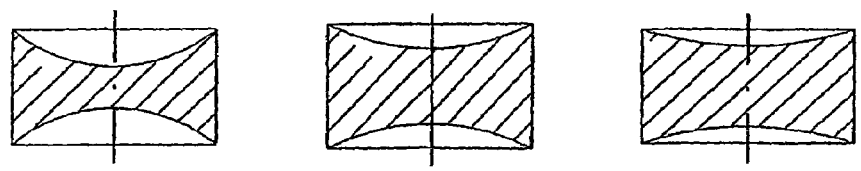
FIG. 4 shows possible embodiments of the auxiliary joining element.
Figure 4:
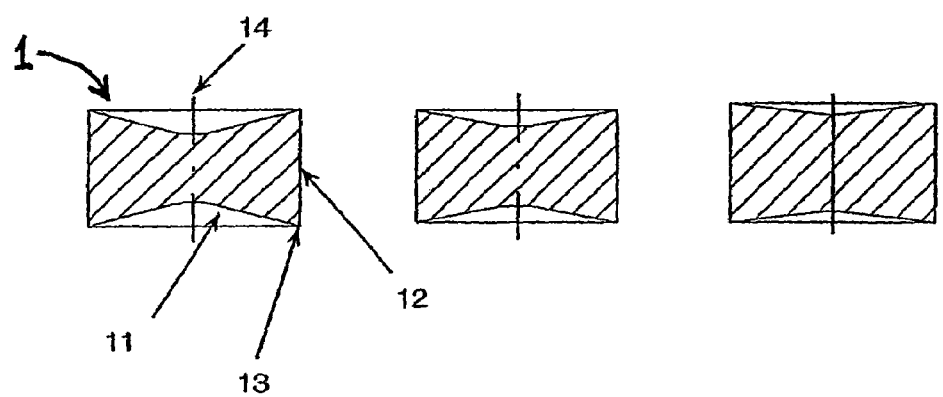
Figure 4:
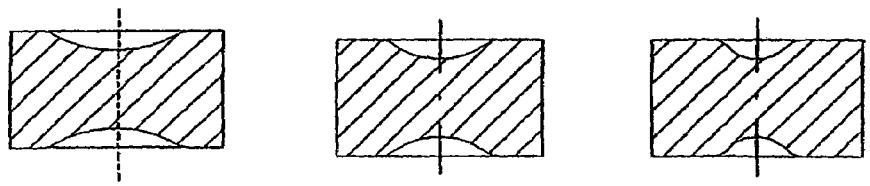

For joining (connecting) the two structural components 2, 3 (also called the first structural component 2 and the second structural component 3 for convenience), an auxiliary joining element 1, in particular a clinch rivet, is shown in FIG. 1. Possible embodiments of this clinch rivet are presented in FIG. 4.

In addition to a rotation symmetry with respect to the longitudinal axis 14, the clinch rivet shown has also a mirror symmetry on the middle orthogonal plane with respect to said longitudinal axis 14, and, consequently, it will not be necessary to orient the position of the rivets prior to the joining process.

The transitions 13 of the end faces 11 to the generating line of the rivet 12 can be described by a double chamfer, a single chamfer or a radius.

In a further embodiment of the rivet, this transition 13 is described by a tractrix curve, which is also referred to as tractrix. This tractrix curve starts on the generating line of the rivet and approaches then asymptotically the rivet end face until it ends at the centre. The curve parameters depend on respective case of use.

A feature which all the embodiments have in common is that the plastic flow of the displaced material of the plate-shaped components is supported by the design of the transition from the generating line to the end face.

According to a specially preferred embodiment, the auxiliary joining element is provided with a head on the upper end thereof.

FIG. 1 shows a starting position (before the components are joined) in which the auxiliary joining element 1 is, in this drawing, positioned above two superimposed plateshaped components 2, 3 which, in turn, abut on a flat countertool 4.

These plateshaped components 2, 3 are clamped by a hold-down device 5. This hold-down device 5 has an opening 5b with an angle 5a at the top. In this opening a joining punch 6 is arranged.

This joining punch 6 is adapted to be swivelled in a rotationfree manner about the intersection between the longitudinal axis 14 of the auxiliary jointing element (rivet) 1 and the longitudinal axis 16 of the punch 6 in the opening 5b so as to permit a wobbling movement of the punch 6.

According to the present embodiment of the method of joining the overlapping plateshaped components 2, 3 with the aid of the deformable auxiliary joining element 1, the auxiliary joining element 1 is pressed into the components to be joined 2, 3 by the upper tool 5,6 that is displaced against the essentially flat lower tool 4 at least with an axial advancing movement on basis of an axially acting process force, whereby a positive connection is formed in the connection area of these components 2, 3 under plastic deformation of the components 2, 3 as well as of the auxiliary joining element 1.

According to a preferred embodiment, this wobbling movement of the punch 6 will be superimposed on the axial advancing movement for applying the clinch rivet when the method is being executed. This wobbling movement itself can be superimposed on the axial advancing movement either during the whole joining process or during only part of said joining process. Due to the wobbling movement, the material of the plateshaped components 2, 3 will be partially deformed so that the process forces will markedly decrease, as has been described.

While the punch 6 executes this wobbling movement, the process force can be superimposed by a variable additional force which depends on the wobbling movement. While the contact area defined between the end face 6b of the punch and the end face 11 of the auxiliary joining element migrates from the centre of the rivet outwards, this additional force is added to the process force, and while this area migrates from the outside to the inside this additional force is subtracted from the process force. Furthermore, the desired flow of material in a radial direction from the inside to the outside is supported by this variable additional force, whereby the diameter of the rivet will additionally be enlarged on the surface and the gap between the rivet and the plate material can be levelled more easily.

When a smaller visible rivet diameter is desired for a case of use, the variable additional force can be superimposed with 180° phase displacement, and the radially outwards directed flow of material in the rivet will be suppressed to a high degree.

The variable force depending on the wobbling movement can be applied via the upper tool 5, 6 or via the lower tool. The process force is, in addition, preferably applied in a pulselike mode via the upper tool 5, 6.

The countertool 4 has preferably provided thereon a device for applying this variable additional force to the process, said device being controllable in dependence upon the wobbling position of the punch 6.

In accordance with a further embodiment, the device for applying said variable additional force to the process is arranged on the same side as the upper tool.

Mechanical, electromagnetic or piezoelectric devices, which can be controlled exactly with respect to the generation of the cyclic additional force, are suitable to be used for all the above-mentioned embodiments. In particular the pulselike joining can be realized by a mechanically, pneumatically, hydraulically or piezoelectrically driven device.

The countertool 4 is preferably implemented such that its area of contact with the plateshaped components is flat. When a flat countertool 4 is used, a bulge having the lower bulge dimension 8 will be formed in the lower plate in dependence upon the magnitude of the force applied to the hold-down device 5. If the accumulation of material is to be formed on the punch-side of the plates 2, a gap is provided between the hold-down device 5 and the punch 6 and the hold-down device 5 is acted upon by a stronger force.

Figure 2:
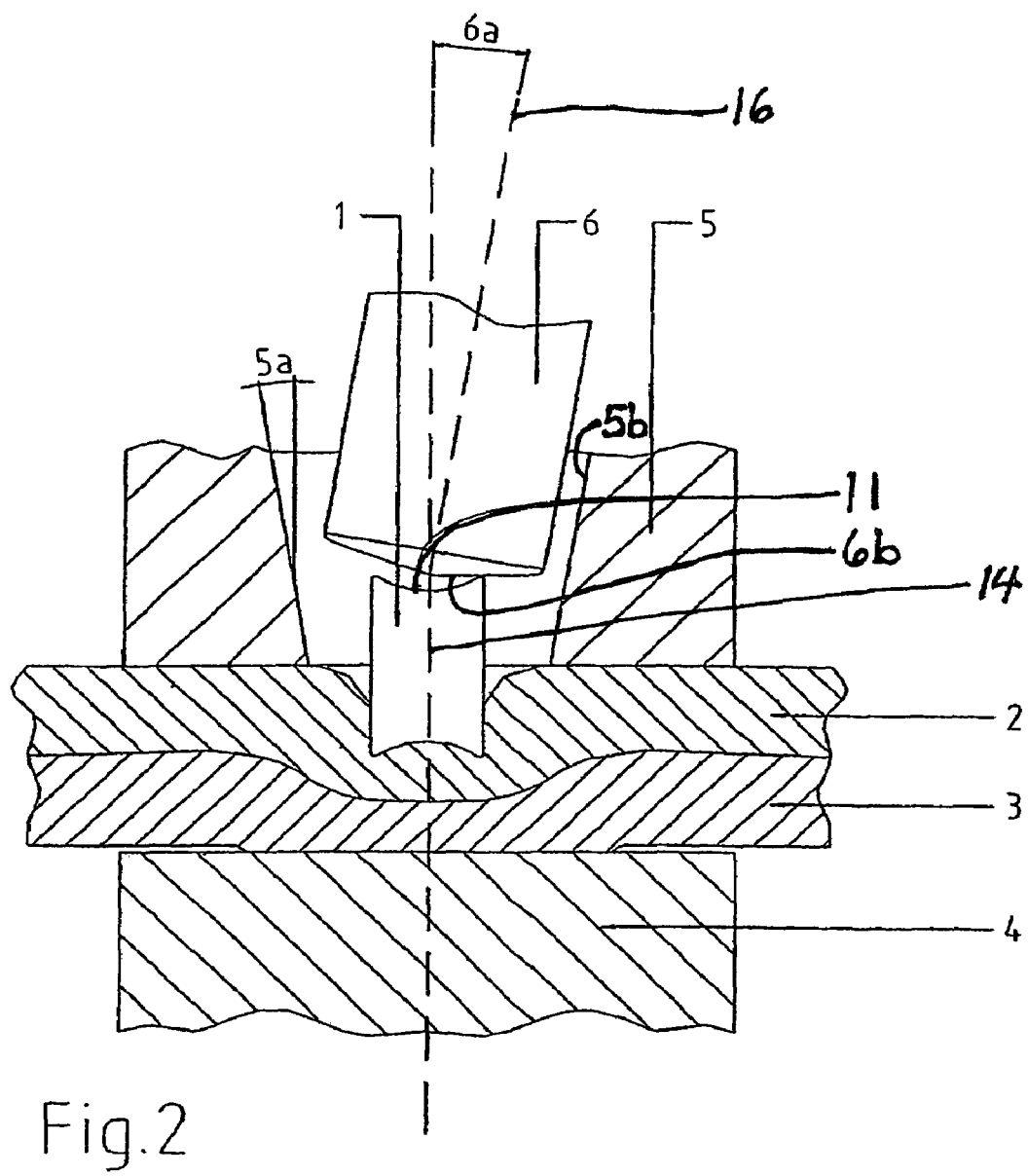
FIG. 2 shows the device as well as the plate-shaped components in an intermediate state during the production of the joint.

FIG. 2 shows an intermediate state of the joining process in the case of which the rivet 1 has already been driven into the plates 2, 3 to a certain extent. The rivet 1 is pressed into the plates by the above-described axial advancing movement of the punch 6, which is superimposed by a wobbling movement with the constant or variable wobbling angle 6a; this wobbling movement has been described as well. This has the effect that material is displaced by the rivet 1. An undercut 7 has, however, not yet been formed.

Figure 3:
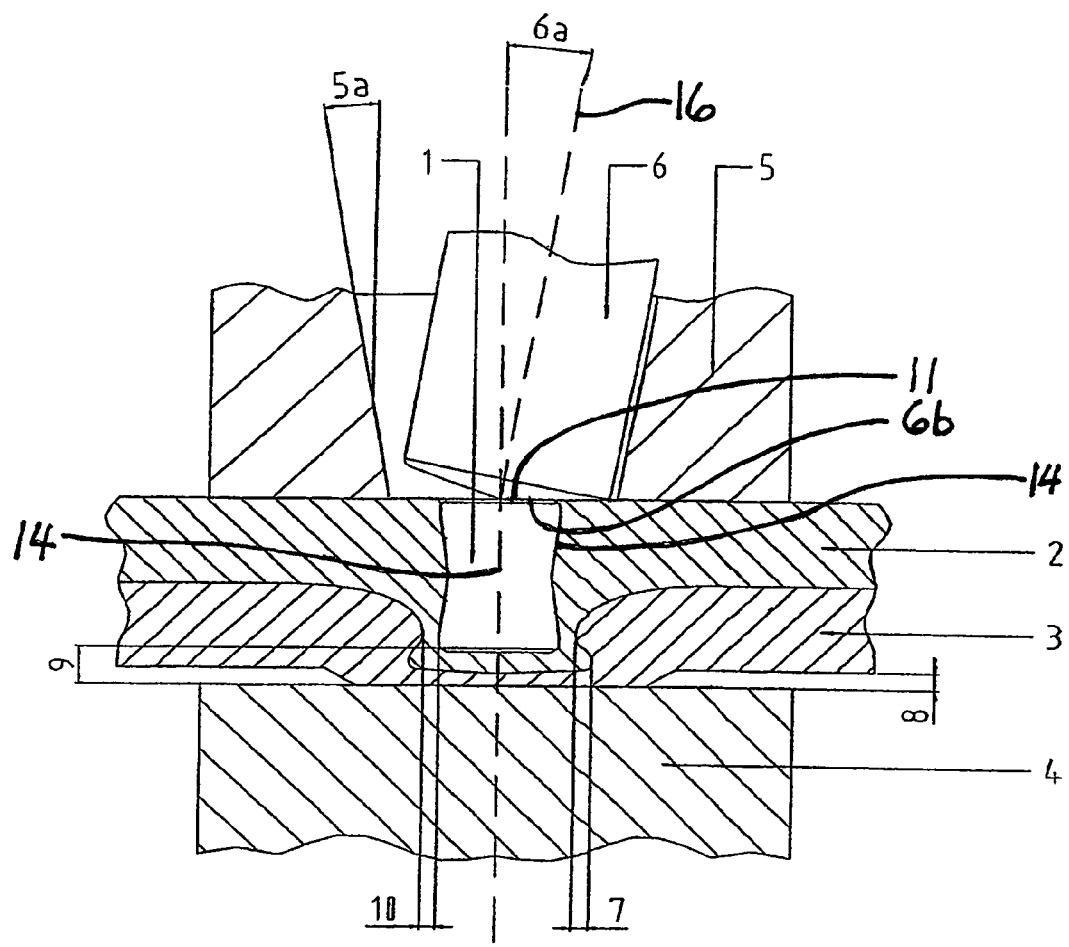
FIG. 3 shows the device and the plate-shaped components after the production of the joint.

In FIG. 3 the final condition of the joining process is shown. The material in the plates 2, 3 is displaced by the rivet 1 in such a way that an undercut 7 between the upper and lower plates 2, 3 is formed. By means of this undercut a positive connection is formed between the plateshaped components 2, 3. The formation of the undercut 7 is supported by the plastic deformation of the rivet 1. Cavities between the circumferential surface of the rivet 1 and the material of the upper plate 2 are compressed when the rivet is being deformed.

The rivet 1 is deformed to a substantial extent in the joining process. In the mounted condition, the rivet 1 has an area of reduced width, which does not exist in the original condition. This area of reduced width supports the formation of the undercut and prevents the rivet from falling out of the joint in the future.

On the basis of the process described, also an intimate connection may be formed, in addition to the above-described positive connection, in dependence upon the materials used and the process forces and temperatures applied.

The auxiliary joining element will normally not penetrate the plate 2, which is arranged on the top in the drawing. A residual layer remains between auxiliary joining element 1 and the plate 3 which is arranged at the bottom in the drawing. It follows that, even after the end of the joining process, the auxiliary joining element will, at least in the connecting area, normally be only in contact with one of the two plateshaped components 2.

The undercut 7 formed by this joining process influences together with the residual layer thickness 9 and the neck thickness 10 the strength of the joining location. By the interplay of the above-described process parameters, in particular the joining force, the force of the hold-down device, the nature and the duration of the wobbling movement and the geometries of the plateshaped components 2, 3, the clinch rivet 1, the hold-down device 5 and the punch 6, these magnitudes can be influenced accurately and effectively.

In the above embodiments a method has been presented for joining at least partially overlapping plateshaped components, in particular metal plates, in a mechanical joining process without prepunching and with the aid of an auxiliary joining element that can be produced in a simple manner. Making use of an upper tool and a lower tool and executing an axial advancing movement which can be superimposed by a wobbling movement of the upper tool, the auxiliary joining element is pressed into the components to be joined in such a way that a positive and/or intimate connection is formed, under plastic deformation, in the connecting area of these plateshaped components. The connecting area of the positive and/or intimate connection includes at least one undercut consisting of the material of said plateshaped components.

At least in the connecting area, the auxiliary joining element is normally exclusively in contact with one of the two plateshaped components even after the end of the joining process.

The auxiliary joining element undergoes a change of shape during the joining process and contributes to the formation of the undercut in this way. Cavities remaining on the circumferential surface of the rivet are avoided.

The wobbling movement of the above-described punch in the upper tool can be superimposed on the advancing movement either during the whole joining process or exclusively during a part of the joining process.

A variable additional force, which depends on the wobbling movement of the punch in the upper tool, can be superimposed on the process force; this variable additional force can increase in value when the wobbling angle increases, and it can be reduced to a smaller value when said angle decreases.

Said additional force can be applied either via the upper tool or via the lower tool.

The hold-down force applied by the hold-down device 5, which fixes the components 2, 3 to be joined during the joining process, can be chosen freely, whereby it is possible to influence the flow of material in the direction of the upper tool 6 or the lower tool 4 as well as the formation of the undercut 7.

In the above embodiments a device is presented which serves in particular for executing the above-described methods according to claim 1 and the respective subclaims, said device comprising an upper tool, a lower tool and an auxiliary joining element. This device is characterized by a punch which executes a wobbling movement as well as an axial advancing movement and which represents a constituent part of the upper tool in engagement with a deformable auxiliary joining element and the lower tool which is arranged on the opposite side of the metal plates to be joined.

The end face of the punch has a diameter which is larger than or which has the same size as the diameter of the respective end face of the auxiliary joining element.

The hold-down device, which is a constituent part of the upper tool, can be provided with a recess on the end face facing the plateshaped components, said recess being provided for receiving therein material displaced due to the process carried out.

The auxiliary joining element is preferably implemented as a clinch rivet.

This clinch rivet is formed of hardened steel or high-strength aluminium alloys. The rivet is formed symmetrically to the longitudinal axis with respect to a middle orthogonal plane and has therefore a further, second symmetry in addition to the rotation symmetry.

The countertool, which is used for producing the necessary counterforce, is either connected to a tool frame in a substantially rigid fashion or it is supported such that it is movable.

The countertool used for producing the necessary counterforce is substantially flat.

The variable additional force, which depends on the wobbling movement in dependence upon the wobbling position, can be produced by a mechanically, electromagnetically or piezoelectrically driven device.

The invention claimed is:

1. A method for joining at least a first component and a second component, comprising:

arranging the first component to at least partially overlap the second component between an axially moveable upper tool and a lower tool with a flat surface, at least a portion of which is directly beneath the upper tool so that the portion of the flat surface of the lower tool which is directly beneath the upper tool abuts the second component; and after the first component and the second component are arranged between the upper tool and the lower tool with the portion of the flat surface of the lower tool which is directly beneath the upper tool abutting the second component, then maintaining said portion of the flat surface bearing against the second component while pressing an auxiliary joining element with the upper tool axially into the first component to a sufficient extent and with sufficient force to deform the first component, the second component, and the auxiliary joining element plastically between the upper tool and the flat surface enough to cause the first component to extend axially into the second component and then spread radially into a portion of the second component to form an undercut of the first component in the second component and thereby join the first component and the second component in inseparable relation to each other.

2. A method according to claim 1, including pressing the auxiliary joining element during the joining process into the first component to a sufficient extent and with sufficient force to produce a bulge in the second component against the flat surface and plastic deformation of the auxiliary joining element and of portions of the first component surrounding the auxiliary joining element to an extent that reduces the width of the auxiliary joining element while said plastic deformation of the auxiliary joining element contributes to formation of the undercut and eliminates cavities between the circumferential surface of the auxiliary joining element and the plastically deforming first component.

3. A method according to claim 1, including pressing the auxiliary joining element into the first component to an extent that deforms but does not pierce the first component so that the auxiliary joining element is exclusively in contact with the first component even after the end of the joining process.

4. A method according to claim 1, wherein the first component and the second component have, at least sectionwise, a plateshaped structural design.

5. A method according to claim 1, wherein the force is applied in a pulselike mode via the upper tool.

6. A method according to claim 1, including applying a freely selectable hold-down force to clamp the first component and the second component to the flat surface of the lower tool, including increasing said hold-down force to increase plastic flow of material comprising the first component and the second component in the direction of the upper tool and decreasing said hold-down force to increase plastic flow of said material in the direction of the lower tool.

7. A method according to claim 1, including superimposing a wobbling movement on at least some of the axial movement of said upper tool that presses the auxiliary joining element into the first component.

8. A method according to claim 7, including superimposing the wobbling movement on all of said axial movement of the upper tool that presses the auxiliary joining element into the first component.

9. A method according to claim 7, including superimposing the wobbling movement at various angles in relation to the longitudinal axis of the upper tool.

10. A method according to claim 7, including superimposing a variable additional force on the auxiliary joining element depending on the wobbling movement of the punch in the upper tool, wherein said variable additional force is increased in value when the wobbling angle increases and is reduced in value when the wobbling angle decreases.

11. A method according to claim 10, wherein the variable force is applied via the upper tool.

12. A method according to claim 10, wherein the variable force is applied via the lower tool.

13. A method according to claim 7, including applying a freely selectable hold-down force to clamp the first component and the second component to the flat surface of the lower tool, including increasing said hold-down force to increase plastic flow of material comprising the first component and the second component in the direction of the upper tool and decreasing said hold-down force to increase plastic flow of said material in the direction of the lower tool.

14. A method for joining at least a first component and a second component, comprising:
arranging the first component to at least partially overlap the second component between an axially movable upper tool and a lower tool with a flat surface that is axially aligned with the upper tool so that the flat surface of the lower tool abuts the second component; and
pressing an auxiliary joining element with the upper tool axially into the first component to a sufficient extent and with sufficient force, including superimposing a wobbling movement on at least some of the axial movement of said upper tool that presses the auxiliary joining element into the first component, to deform the first component, the second component, and the auxiliary joining element plastically between the upper tool and the flat surface enough to join the first component and the second component in immovable relation to each other.

15. A method according to claim 14, including superimposing the wobbling movement on all of said axial movement of the upper tool that presses the auxiliary joining element into the first component.

16. A method according to claim 14, including superimposing the wobbling movement at various angles in relation to the longitudinal axis of the upper tool.

17. A method according to claim 16, including superimposing a variable additional force on the auxiliary joining element depending on the wobbling movement of the punch in the upper tool, wherein said variable additional force is increased in value when the wobbling angle increases and is reduced in value when the wobbling angle decreases.

18. A method according to claim 17, wherein the variable force is applied via the upper tool.

19. The method according to claim 17, wherein the variable force is applied via the lower tool.

* * * * *